US008346682B2

(12) United States Patent
Steed et al.

(10) Patent No.: US 8,346,682 B2
(45) Date of Patent: Jan. 1, 2013

(54) INFORMATION ASSISTED VISUAL INTERFACE, SYSTEM, AND METHOD FOR IDENTIFYING AND QUANTIFYING MULTIVARIATE ASSOCIATIONS

(75) Inventors: Chad A. Steed, Purvis, MS (US); J. Edward Swan, II, Starkville, MS (US); T.J. Jankun-Kelly, Starkville, MS (US); Patrick J. Fitzpatrick, Slidell, LA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 503 days.

(21) Appl. No.: 12/691,853

(22) Filed: Jan. 22, 2010

(65) Prior Publication Data
US 2010/0191678 A1 Jul. 29, 2010

Related U.S. Application Data

(60) Provisional application No. 61/146,717, filed on Jan. 23, 2009.

(51) Int. Cl.
*G06F 17/00* (2006.01)
*G06F 3/00* (2006.01)
(52) U.S. Cl. .......................... 706/11; 715/700
(58) Field of Classification Search ........................ None
See application file for complete search history.

(56) References Cited

U.S. PATENT DOCUMENTS

| | | | |
|---|---|---|---|
| 4,823,272 A | 4/1989 | Inselberg | |
| 5,058,024 A | 10/1991 | Inselberg | |
| 5,173,861 A | 12/1992 | Inselberg et al. | |
| 5,546,516 A | 8/1996 | Austel | |
| 5,631,882 A | 5/1997 | Mascenik | |
| 5,631,982 A | 5/1997 | Inselberg et al. | |
| 5,717,589 A | 2/1998 | Thompson et al. | |
| 5,917,500 A | 6/1999 | Johnson et al. | |
| 6,026,399 A * | 2/2000 | Kohavi et al. ........................ | 1/1 |
| 6,034,710 A | 3/2000 | Hutchinson et al. | |
| 6,362,823 B1 | 3/2002 | Johnson et al. | |
| 6,842,176 B2 * | 1/2005 | Sang'udi et al. .............. | 345/440 |
| 6,845,324 B2 | 1/2005 | Smith | |
| 6,920,233 B2 | 7/2005 | Wolfson et al. | |
| 6,985,779 B2 * | 1/2006 | Hsiung et al. .................. | 700/19 |
| 7,219,015 B2 | 5/2007 | Bresch et al. | |
| 7,359,799 B2 | 4/2008 | Bresch et al. | |
| 2004/0148578 A1 * | 7/2004 | McConaghy et al. ............ | 716/1 |
| 2007/0211057 A1 | 9/2007 | Navratil et al. | |

OTHER PUBLICATIONS

P.J. Klotzbach, W.M. Gray, and W. Thorson, Extended range forecast of Atlantic seasonal hurricane activity and U.S. landfall strike probability for 2007, technical report, 2006. Http://tropical.atmos. colostate.edu/forecasts/2006/dec2006/;accessed Apr. 15, 2009.

(Continued)

*Primary Examiner* — Alan Chen
(74) *Attorney, Agent, or Firm* — Amy L. Ressing; Joslyn Barritt; Kathleen Chapman

(57) ABSTRACT

Systems and methods are presented in which interactive parallel coordinates capabilities are combined with automated correlation and regression tools providing advanced visual user interface utilities to facilitate identification of associations in multivariate data.

36 Claims, 7 Drawing Sheets

OTHER PUBLICATIONS

P.J. Klotzbach and W.M. Gray, "Summary of 2006 Atlantic tropical cyclone activity and verification of author's seasonal and monthly forecasts", technical report, Nov. 2006. Http://hurricane.atmos.colostate.edu/forecasts/2006/nov2006/; accessed Apr. 15, 2009.

P.C. Wong and R.D. Bergeron. 1997. 30 years of multidimensional multivariate visualization, from G.M. Nielson, H. Hagan, and H. Muller (eds), Scientific visualization—Overviews, methodologies, and techniques. Los Alamitos, California: IEEE Computer Society Press. pp. 3-33.

L. Wilkinson, A. Anand, and R. Grossman. 2006. High-dimensional visual analytics: Interactive exploration guided by pairwise views of point distributions, IEEE Transactions on Visualization and Computer Graphics 12(6): 1366-72.

C.G. Healey, L. Tateosian, J.T. Enns, and M. Remple. 2004. Perceptually-based brush strokes for nonphotorealistic visualization, ACM Transactions on Graphics 23(1): 64-96.

A. Inselberg, 1985, The plane with parallel coordinates, The Visual Computer 1(4): 69-91.

E.J. Wegman, 1990. Hyperdimensional data analysis using parallel coordinates, Journal of the American Statistical Association 85(411): 664-75.

H. Hauser, F. Ledermann, and H. Doleisch. 2002 Angular brushing of extended parallel coordinates, Proceedings of IEEE Symposium on Information Visualization, Boston, Massachusetts, IEEE Computer Society. pp. 127-130.

H. Siirtola, 2000, Direct manipulation of parallel coordinates, Proceedings of the International Conference on Information Visualisation, London, England, IEEE Computer Society. pp. 373-378.

J. Johansson, P. Ljung, M.Jern, and M. Cooper, 2005, Revealing structure within clustered parallel coordinates displays, IEEE Symposium on Information Visualization, Minneapolis, Minnesota, Oct. 2005, IEEE Computer Society. pp. 125-132.

Y-H. Fua, M.O. Ward, and E.A. Rundensteiner. Hierarchical parallel coordinates for exploration of large datasets, Proceedings of IEEE Visualization, San Francisco, California, Oct. 1999, IEEE Computer Society. pp. 43-50.).

A.O. Artero, M.C.F. De Oliveira, and H. Levkowitz, Uncovering clusters in crowded parallel coordinates visualization, IEEE Symposium on Information Visualization, Austin, Texas, Oct. 2004, IEEE Computer Society. pp. 81-88.).

M. Novotny and H. Hauser, Outlier-preserving focus+context visualization in parallel coordinates, IEEE Transactions on Visualization and Computer Graphics 12(5): 893-900.).

H. Qu, W. Chan, A. Xu, K. Chung, K. Lau, and P. Guo., 2007, Visual analysis of the air pollution problem in Hong Kong, IEEE Transactions on Visualization and Computer Graphics 13(6): 1408-15.

H. Piringer, W. Berger, and H. Hauser, Quantifying and comparing features in high dimensional datasets, International Conference on Information Visualization, London, UK, Jul. 2008, IEEE Computer Society. pp. 240-245, incorporated herein by reference.

M. Jern, M. Brezzi, and L.Thygesen, A web-enabled geovisual analytics tool applied to OECD regional data, NCVA—National Center for Visual Analytics, ITN, Linkoping University, Sweden, OECD, Paris, France, Mar. 20, 2009.

C.A. Steed, Parallel Coordinates Analytic Toolkit for Multivariate Data Analysis, U.S. Appl. No. 61/146,717, filed Jan. 23, 2009.

* cited by examiner

INFORMATION ASSISTED VISUAL INTERFACE, SYSTEM, AND METHOD FOR IDENTIFYING AND QUANTIFYING MULTIVARIATE ASSOCIATIONS

CROSS-REFERENCE TO RELATED APPLICATION

This application claims priority to and the benefit of U.S. Provisional Patent Application Ser. No. 61/146,717, filed Jan. 23, 2009, entitled "Parallel Coordinates Analytic Toolkit for Multivariate Data Analysis", the entirety of which is hereby incorporated by reference.

FIELD OF THE DISCLOSURE

The present disclosure relates generally to multivariate data analysis and more particularly to systems and methods for identifying and/or quantifying sets of independent variables that are highly predictive of conditions of an identified dependent variable in a data set.

BACKGROUND

Analysis of multivariate data is useful for predicting environmental conditions such as cyclones and more generally for identifying and/or quantifying associations between a set of interrelated variables. In climate studies, for example, identifying environmental variables that have the greatest impact on the intensity and frequency of seasonal hurricane activity has thusfar been difficult due to uncertainty and complexity of dynamic, environmental data sets. Conventional data analysis tools and techniques do not support the increasing quantity and number of different parameters in the data for climate studies. As a result, the increased availability of additional environmental data has not lead to a commensurate improvement in the accuracy of seasonal forecasts or to improved preparedness to reduce the impact of natural disasters.

It is believed that predictors of the main dynamic parameters that affect storm activity are observable well in advance, and thus may be used to provide early predictions. The importance of these predictors can be estimated using historical data by statistical regression techniques similar to those described by Vitart, F. 2004. *Dynamical seasonal forecasts of tropical storm statistics*. In: R. J. Murnane and K.-B. Liu (eds), *Hurricanes and typhoons: Past, present, and future*. Columbia University Press, New York, N.Y., December 2004. pp. 354-92, the entirety of which is hereby incorporated by reference. Klotzbach et al. used this technique to determine the most important variables for predicting the frequency of North Atlantic tropical cyclone activity, as shown in P. J. Klotzbach and W. M. Gray, 2006, *Summary of 2006 Atlantic tropical cyclone activity and verification of author's seasonal and monthly forecasts*, Technical report, November 2006. [http://hurricane.atmos.colostate.edu/Forecasts/2006/nov2006/; accessed Apr. 15, 2009]; and P. J. Klotzbach, W. M. Gray, and W. Thorson, 2006, *Extended range forecast of Atlantic seasonal hurricane activity and U.S. landfall strike probability for 2007*, Technical report, 2006. [http://tropical.atmos.colostate.edu/Forecasts/2006/dec2006/; accessed Apr. 15, 2009], the entireties of which are hereby incorporated by reference. A multiple regression scheme called the Typhoon Intensity Prediction Scheme (TIPS) combining satellite information with other environmental predictors was developed to understand and forecast tropical cyclone intensity for the western North Pacific Ocean, as described in P. J. Fitzpatrick 1996. *Understanding and forecasting tropical cyclone intensity change*, PhD dissertation, Department of Atmospheric Sciences, Colorado State University, Fort Collins, Colorado, the entirety of which is hereby incorporated by reference.

Regression analysis techniques are often complicated to establish, but provide an ordered list of the most important predictors for the dynamic parameters. Scientists gain additional insight and identify the more informative variables in these studies by evaluating descriptive statistics and performing correlation analysis. In the past, researchers have relied on simple scatter plots and histograms which require several separate plots or layered plots to analyze multiple variables. However, perceptual issues limit the effectiveness of this approach, particularly for large numbers of variables in a given multivariate data set.

One proposed solution is scatter plot matrix (SPLOM) which presents multiple adjacent scatter plots for all the variable comparisons in a single display with a matrix configuration, as described by P. C. Wong, and R. D. Bergeron. 1997. 30 years of multidimensional multivariate visualization, from G. M. Nielson, H. Hagan, and H. Muller (eds), *Scientific visualization—Overviews, methodologies, and techniques*. Los Alamitos, California: IEEE Computer Society Press. pp. 3-33, incorporated herein by reference. This approach, however, requires a large amount of screen space, and forming multivariate associations is still mentally challenging. Statistical measures have been used to organize the SPLOM and guide the viewer through exploratory analysis of high-dimensional data sets, as described in L. Wilkinson, A. Anand, and R. Grossman. 2006. *High-dimensional visual analytics: Interactive exploration guided by pairwise views of point distributions*, IEEE Transactions on Visualization and Computer Graphics 12(6): 1366-72, incorporated by reference, and while somewhat better, perceptual problems remain.

Another alternative is to use layered plots, which condenses the information into a single display, but there are significant issues due to layer occlusion and interference, as demonstrated by C. G. Healey, L. Tateosian, J. T. Enns, and M. Remple. 2004. *Perceptually-based brush strokes for non-photorealistic visualization*, ACM Transactions on Graphics 23(1): 64-96, incorporated herein by reference. The geographically encoded data used in climate studies are usually displayed in the context of a geographical map. Although certain important patterns (those directly related to geographic position) may be recognized in this context, additional information may be discovered more rapidly using non-geographical information visualization techniques. Thusfar, few multivariate visualization techniques provide access to integrated, automatic statistical analysis techniques that are commonly utilized in climate studies to identify significant associations.

Another multivariate visualization technique known as parallel coordinates is described in A. Inselberg, 1985, *The plane with parallel coordinates*, The Visual Computer 1(4): 69-91, incorporated by reference, and this technique was applied the technique to the analysis of multivariate relationships in data in E. J. Wegman, 1990. *Hyperdimensional data analysis using parallel coordinates*, Journal of the American Statistical Association 85(411): 664-75, incorporated by reference. The parallel coordinates approach provides a compact, two-dimensional representation of even large multidimensional data sets. Hauser et al. described a histogram display, dynamic axis reordering, axis inversion, and some details-on-demand capabilities for parallel coordinates in H. Hauser, F. Ledermann, and H. Doleisch. 2002 *Angular brushing of extended parallel coordinates*, Proceedings of IEEE Symposium on Information Visualization, Boston, Mass., IEEE Computer Society. pp. 127-30, incorporated herein by reference. Siirtola presented a rich set of dynamic interaction techniques (e.g., conjunctive queries) was presented by H. Siirtola, 2000. *Direct manipulation of parallel coordinates*, Proceedings of the International Conference on Information Visualisation, London, England, IEEE Computer Society. pp. 373-78, and Jankun-Kelly and Waters (2006) and Johansson et al. described new line-shading schemes for parallel coordinates in J. Johansson, P. Ljung, M. Jern, and M. Cooper, 2005, *Revealing structure within clustered parallel coordinates displays*, IEEE Symposium on Information Visualization, Minneapolis, Minn., October 2005, IEEE Computer Society. pp. 125-32, both of which are incorporated herein by reference.

Focus+context implementations for parallel coordinates have been introduced by Fua et al. (Y-H. Fua, M. O. Ward, and E. A. Rundensteiner. 1999, *Hierarchical parallel coordinates for exploration of large datasets*, Proceedings of IEEE Visualization, San Francisco, Calif., October 1999, IEEE Computer Society. pp. 43-50.); Artero et al. (A. O. Artero, M. C. F. de Oliveira, and H. Levkowitz, *Uncovering clusters in crowded parallel coordinates visualization*, IEEE Symposium on Information Visualization, Austin, Tex., October 2004, IEEE Computer Society. pp. 81-8.); Johansson et al. supra; and Novotny and Hauser (M. Novotny and H. Hauser, *Outlier-preserving focus+context visualization in parallel coordinates*, IEEE Transactions on Visualization and Computer Graphics 12(5): 893-900.), the entireties of which are incorporated herein by reference.

Qu et al. (2007) introduced a method for integrating correlation computations into a parallel coordinates display in H. Qu, W. Chan, A. Xu, K. Chung, K. Lau, and P. Guo., 2007, *Visual analysis of the air pollution problem in Hong Kong*, IEEE Transactions on Visualization and Computer Graphics 13(6): 1408-15, incorporated by reference. Seo and Shneiderman used a framework to explore and comprehend multidimensional data using a powerful rank-by-feature system that guides the user and supports confirmation of discoveries, in J. Seo and B. Shneiderman, 2005, *A rank-by-feature framework for interactive exploration of multidimensional data*, Information Visualization 4(2): 96-113, incorporated herein by reference, and Piringer et al. (2008) expanded this rank-by-feature approach by focusing on the comparison of subsets in high-dimensional data sets, described in H. Piringer, W. Berger, and H. Hauser, 2008, *Quantifying and comparing features in high dimensional datasets*, International Conference on Information Visualization, London, UK, July 2008, IEEE Computer Society. pp. 240-45, incorporated herein by reference. Parallel coordinates tools have also been developed for analyzing social and economic data for comparing different geographical regions.

SUMMARY OF DISCLOSURE

Various details of the present disclosure are hereinafter summarized to facilitate a basic understanding, where this summary is not an extensive overview of the disclosure, and is intended neither to identify certain elements of the disclosure, nor to delineate the scope thereof. Rather, the primary purpose of this summary is to present some concepts of the disclosure in a simplified form prior to the more detailed description that is presented hereinafter.

In accordance with the present invention, methods and systems are presented to facilitate advanced visualization-assisted identification and/or quantification associations in a multivariate data set, which can be employed in environmental analysis as well as other fields.

One or more aspects of the present disclosure are provided in a processor-based system that includes a graphical user interface and a parallel coordinates plot (PCP) component which generates a PCP view for rendering on a graphic display for selective modification according to user inputs. The parallel coordinates view includes dependent and independent variable portions with generally parallel axis indicators aligned with one another in an axis region of the PCP view to visually display one or more attributes of a corresponding variable of a multivariate data set. An axis selection indicator is provided which is operable by the user to designate one of the axis indicators as being a selected axis indicator.

The PCP view also includes a plurality of graphical correlation indicators that are presented in proximity to associated dependent or independent variable axis indicators in a correlation region of the PCP view. The correlation indicators graphically indicate a correlation value associated with the corresponding variable of the data set and with a variable associated with the selected axis indicator to facilitate user evaluation of correlations between displayed variables. The system also includes a correlation component that selectively performs correlation operations on user-selected variables of the data set to provide the correlation values to the PCP component for graphical rendering. In certain embodiments, the graphical correlation indicator for a given axis includes a set of correlation indicators in the correlation region of the PCP view. In one exemplary embodiment described below the correlation indicators may be color-coded, while in other embodiments, the correlation indicators may be visually distinguishable by other visual indicia, for example, by patterns or shading, and all such embodiments are within the scope of the present disclosure. The correlation indicators individually correspond to a displayed variable axis indicator and are arranged in order according to a current ordering of the variable axis indicators displayed in the axis region of the PCP view, with the color coding of the set being indicative of a correlation value associated with the corresponding variable of the data set. In some implementations, moreover, the color-coded correlation indicator associated with the selected axis indicator is larger than the other color-coded correlation indicators in each set. The graphical correlation indicator in certain embodiments includes a scatter plot indicator in the correlation region, which includes a plot of points of the data set with data associated with the selected axis indicator as a vertical axis and with data associated with the given axis indicator as a horizontal axis.

In certain embodiments, the PCP view also includes a user-actuatable correlation filter control indicator, and the correlation component determines if any currently selected variable axes are correlated with each other by more than a threshold value. If so, the correlation component automatically removes the axis with a weaker correlation coefficient with respect to the dependent variable axis from the PCP view.

Certain embodiments of the system include a regression analysis component that selectively performs one or more regression operations on user-selected variables of the data set and provides one or more regression values associated with one or more variables of the data set. The PCP view in certain embodiments includes a plurality of graphical regression indicators individually associated with and proximate to a corresponding variable axis indicator in a regression region, which graphically indicate one or more regression values associated with the corresponding variable to the user. In some implementations, the regression analysis component selectively performs a simple linear regression (SLR) operation on user-selected variables and provides an SLR regression value for at least one of the variables of the data set. In these examples, the graphical regression indicator includes an SLR indicator that graphically indicates a SLR regression value associated with the corresponding dependent or independent variable axis indicator.

The regression analysis component in certain embodiments selectively performs a stepwise multiple linear regression (MLR) operation on user-selected variables and provides an MLR regression value, and a graphical MLR indicator graphically indicates the MLR regression value. In certain implementations, the regression analysis component provides an MLR $R^2$ value and the graphical regression indicator for the dependent variable axis indicator includes a numeric $R^2$ value indicator proximate to the dependent variable axis indicator.

In certain embodiments, the PCP component is further operative to concurrently adjust upper and lower limits when the user rotates a mouse wheel to expand a displayed focus range of the selected axis indicator in response to mouse wheel rotation in a first direction and to compress the displayed focus range of the selected axis indicator in response to mouse wheel rotation in a second opposite direction.

Certain embodiments of the system provide one or more of the variable axis indicators with user adjustable upper and lower limit indicators to define a displayed focus range associated with the axis indicator. Relation lines are displayed which pass through at least some variable axis indicators, where a given relation line is displayed as lightly shaded if any point of the relation line is outside the focus range of at least one displayed axis indicator, and relation lines are very darkly shaded if all points of the relation line are within the focus range of each displayed axis indicator, with the remaining relation lines being moderately darkly shaded. In certain embodiments, the relation lines for which all points of the relation line are within the focus range of each displayed axis indicator are displayed in a first darkness range with relation lines nearest to the axis selection indicator are darkest and relation lines farther from the axis selection indicator (e.g. mouse arrow or cursor position) are less dark, and remaining relation lines for which any point of the relation line is outside the focus range of at least one displayed axis indicator are shaded according to a nonlinear fall-off function that yields a gradient of colors with relation lines nearest to the axis selection indicator more prominent than relation lines farther from the axis selection indicator.

Further aspects of the present disclosure provide methods for identifying and/or quantifying sets of independent variables predictive of conditions of an identified dependent variable in a multivariate data set, as well as non-transitory computer readable medium having computer-executable instructions for implementing the methods. The methods include accessing a multivariate data set, rendering a parallel coordinates plot (PCP) view on a graphic display according to the multivariate data set using a processor-based system, where the PCP view includes a dependent variable portion including a dependent variable axis indicator visually displaying one or more attributes of a dependent variable of the data set and a plurality of independent variable portions individually including an independent variable axis indicator visually displaying one or more attributes of an independent variable of the data set, with the independent and dependent variable axis indicators being generally parallel and aligned with one another in an axis region of the PCP view. The methods further include receiving at least one user control input via a user interface, selectively modifying the PCP view according to the user control input, allowing the user to designate one of the axis indicators as being a selected axis indicator via the user control input, and allowing the user to select a particular axis indicator using an axis selection indicator via the user control input.

The methods also include performing at least one correlation operation on user-selected variables of the data set to provide correlation values, and rendering a plurality of graphical correlation indicators individually associated with and proximate to a corresponding dependent or independent variable axis indicator in a correlation region of the PCP view, where the correlation indicators graphically indicate a correlation value associated with the corresponding variable of the data set and with a variable associated with the selected axis indicator. Certain embodiments of the methods also include selectively performing one or more regression operations on user-selected variables of the data set to provide one or more regression values associated with one or more variables of the data set, and rendering a plurality of graphical regression indicators individually associated with and proximate to a corresponding dependent or independent variable axis indicator in a regression region of the PCP view, the graphical regression indicators graphically indicating at least one regression value associated with the corresponding variable of the data set.

BRIEF DESCRIPTION OF THE DRAWINGS

The following description and drawings set forth certain illustrative implementations of the disclosure in detail, which are indicative of several exemplary ways in which the various principles of the disclosure may be carried out. The illustrated examples, however, are not exhaustive of the many possible embodiments of the disclosure. Other objects, advantages and novel features of the disclosure will be set forth in the following detailed description of the disclosure when considered in conjunction with the drawings, in which.

DETAILED DESCRIPTION OF THE DISCLOSURE

Figure 1:
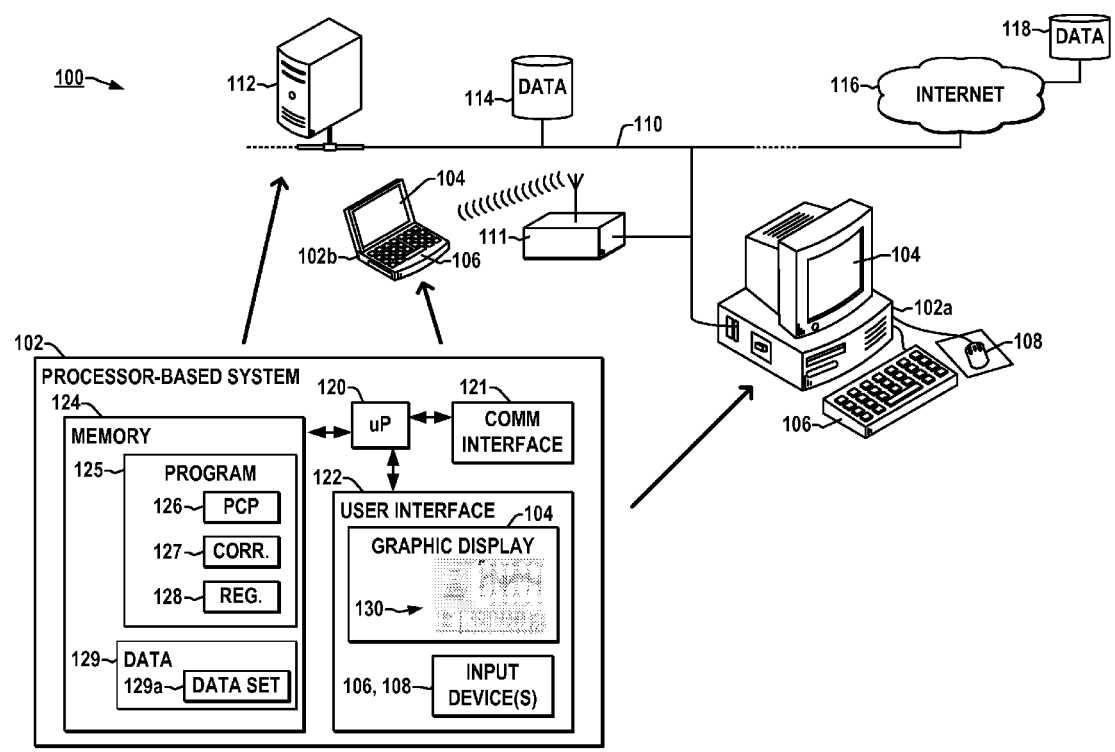
FIG. 1 is a system diagram illustrating an exemplary processor-based computing environment in which one or more aspects of the present disclosure may be practiced including a processor-based system with a graphical user interface (GUI) for interactive identification and quantification of significant predictors for a particular dependent variable via parallel coordinates plot (PCP) and automatic or semiautomatic statistical analysis and regression in accordance with one or more aspects of the present disclosure.

One or more embodiments or implementations are hereinafter described in conjunction with the drawings, where like reference numerals are used to refer to like elements throughout, and where the various features are not necessarily drawn to scale.

Referring initially to FIG. 1, an exemplary processing environment 100 is illustrated in which one or more aspects of the present disclosure may be practiced. The environment 100 includes one or more processor based systems 102 that may be implemented in a networked computing environment. In the illustrated example, a desktop computer 102a and a portable computer 102b are operatively coupled with a network 110, each of which including a graphical display 104 and one or more input devices, such as a keyboard 106, a mouse or other pointing device 108, microphones for speech commands, or other user input devices (not shown), where the portable computer 102b is coupled with the network 110 via a wireless transceiver 111. The network 110, in turn, may be operatively connected with other networks, such as internet 116 providing operative access between the computers 102 and one or more of a network server 112, a network database 114, and/or an internet data store 118. The presently disclosed systems and methods may be implemented in certain embodiments using one or more software program components operating or otherwise executed by a microprocessor or other processing element.

As depicted in FIG. 1, such a processor-based system 102 can be implemented in whole or in part in a network server 112, in one or both of the computers 102, and/or in combinations thereof. In one implementation, the system 102 includes a microprocessor or other processing element 120, a communication interface 121 that operatively interconnects the processor-based system 102 with the network 110, as well as a memory 124 and a graphical user interface 122. As shown in FIG. 1, moreover, the interface 122 includes a graphic display 104 operative to render a multivariate analysis display 130 as further detailed in FIGS. 2A-2D below, as well as one or more input devices such as the illustrated computer keyboard and/or mouse 106,108. The memory 124 in this example includes program code 125 comprising a parallel coordinates plot (PCP) component 126, a correlation analysis component 127, and a regression analysis component 128, where the components 126-128 can be implemented as hardware, processor-executed software, programmable logic, etc. In addition, the memory 124 includes data 129, which may include a multivariate data set 129a. In this regard, the system 102 may operate on a unitary multivariate data set 129a or the data set 129a may be implemented in distributed fashion with storage of portions in the processor-based system 102, the network server 112, and/or in one or more internet based databases 118.

In operation, the system 102 accesses the multivariate data set 129a and uses this to render a parallel coordinates plot (PCP) to the user via the graphic display 104 of the interface 122, and employs user control inputs from the interface 122 to allow the user to perform various operations, including without limitation designation of a dependent variable axis, modification of the PCP view, selection of a particular axis. The system 102 also employs the correlation and regression components 127 and 128 to selectively perform one or more statistical operation such as correlation and/or regression operations on the data set 129a or portions thereof, with the PCP component 126 operating to graphically indicate aspects of the data set 129a as well as correlation and/or regression values generated therefrom.

Improved and timely prediction of adverse environmental conditions can be facilitated by analysis methods and interactive graphics-based tools with integrated statistical processes for intelligent display of real-world, multivariate data 129a. The disclosure provides an interactive geovisual analytics approach using automated statistical analysis to enhance knowledge discovery. The disclosed system 102 combines several parallel coordinates plot (PCP) capabilities and variants of more advanced techniques with new interactive capabilities and statistical analysis processes. Statistical analytic features and interactive parallel coordinates are complementary, with the statistical processes highlighting the relevant associations and the PCP view providing a deeper level of understanding about the relationships between variables of the data set 129a. The system 102 has been tested via detailed analysis of potential predictors for tropical cyclone activity and has been found to provide a comprehensive environment for climate analysis and other multivariate data analysis tasks.

Referring now to FIGS. 2A-2D, FIG. 2A illustrates an exemplary display screen rendered via the graphic display 104 of FIG. 1, in which the PCP component 126 generates and renders a PCP view 130b via the display 104 and allows the user to selectively modify the view 130b according to user control inputs from the interface 122. The illustrated embodiment further includes a control portion 130a with one or more user-actuatable control indicators 133a-133h individually associated with specific functions facilitating analysis and PCP view manipulation by a user. Also provided is a data list portion 130c including a listing of dependent and independent variables and associated data from the multivariate data set 129a.

Figure 2A:
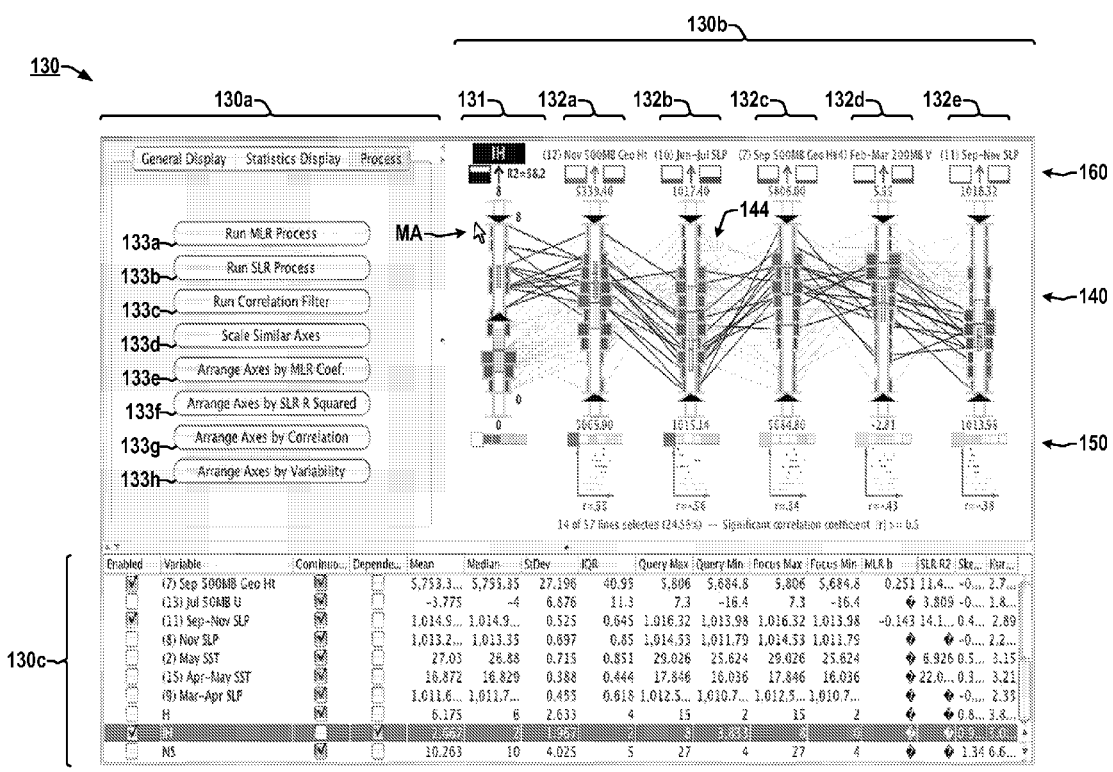
FIG. 2A is a front elevation view illustrating a display portion of a graphical user interface in the system of FIG. 1, including a PCP view, a control portion, and a data list portion.

As shown in FIG. 2A, the PCP view 130b includes a single dependent variable portion 131 which has a dependent variable axis indicator 140a that visually displays one or more attributes of a user designated dependent variable of the data set 129a. In addition, the PCP view 130b includes a plurality of independent variable portions 132 (five exemplary independent variable portions 132a-132e are illustrated in FIG. 2a, but any number of independent variable portions 132 may be depicted depending on the constituents of the data set 129a and any current user selection of data variables for display and analysis). The independent variable portions 132a also individually include an independent variable axis indicator 140a that visually displays one or more attributes of an associated independent variable of the data set 129a. Moreover, the independent and dependent variable axis indicators 140a are generally parallel with one or another and are aligned with one another in axis region 140 of the PCP view 130b. The view 130b also includes an axis indicator MA, such as a mouse pointer or a current cursor location, which is operable via the user control input of the interface 122 at any given time to designate one of the axis indicators 140a as being a selected axis indicator.

In the example of FIG. 2A, a correlation region 150 is provided beneath the axis region 140, which includes a plurality of graphical correlation indicators 150a, 150b which are operative to graphically indicate a correlation value associated with the corresponding variable of the data set 129a and a variable associated with the currently selected axis indicator 140a. The correlation component 127 (FIG. 1) is operative to selectively perform one or more correlation operations on user selected variables of the data set 129a to provide the correlation values to the PCP component 126. In addition, the embodiment of FIG. 2A includes a regression region 160 of the PCP view 130b positioned in certain embodiments above the axis region 140. The regression analysis component 128 (FIG. 1) is operative according to user commands to selectively perform one or more regression operations on user selected variables of the data set 129a and to provide one or more regression values associated with variables of the data set 129a. The regression region 160 includes a plurality of graphical regression indicators 160a, 160b, 160c that are individually associated with and proximate to a corresponding dependent or independent variable axis indicator 140a, where the graphical regression indicators are operative to graphically indicate at least one regression value associated with the corresponding variable of the data set 129a.

The system 102 thus provides an innovative geovisual analytics interface by combining interactive parallel coordinates techniques with statistical indicators and automated analysis processes, including one or more statistical indicators, correlation analysis capabilities, and better integration with regression processes than conventionally available, thereby facilitating the geovisual analytics approach to the investigation of climate trends and to other multivariate data analysis.

Figure 2B:
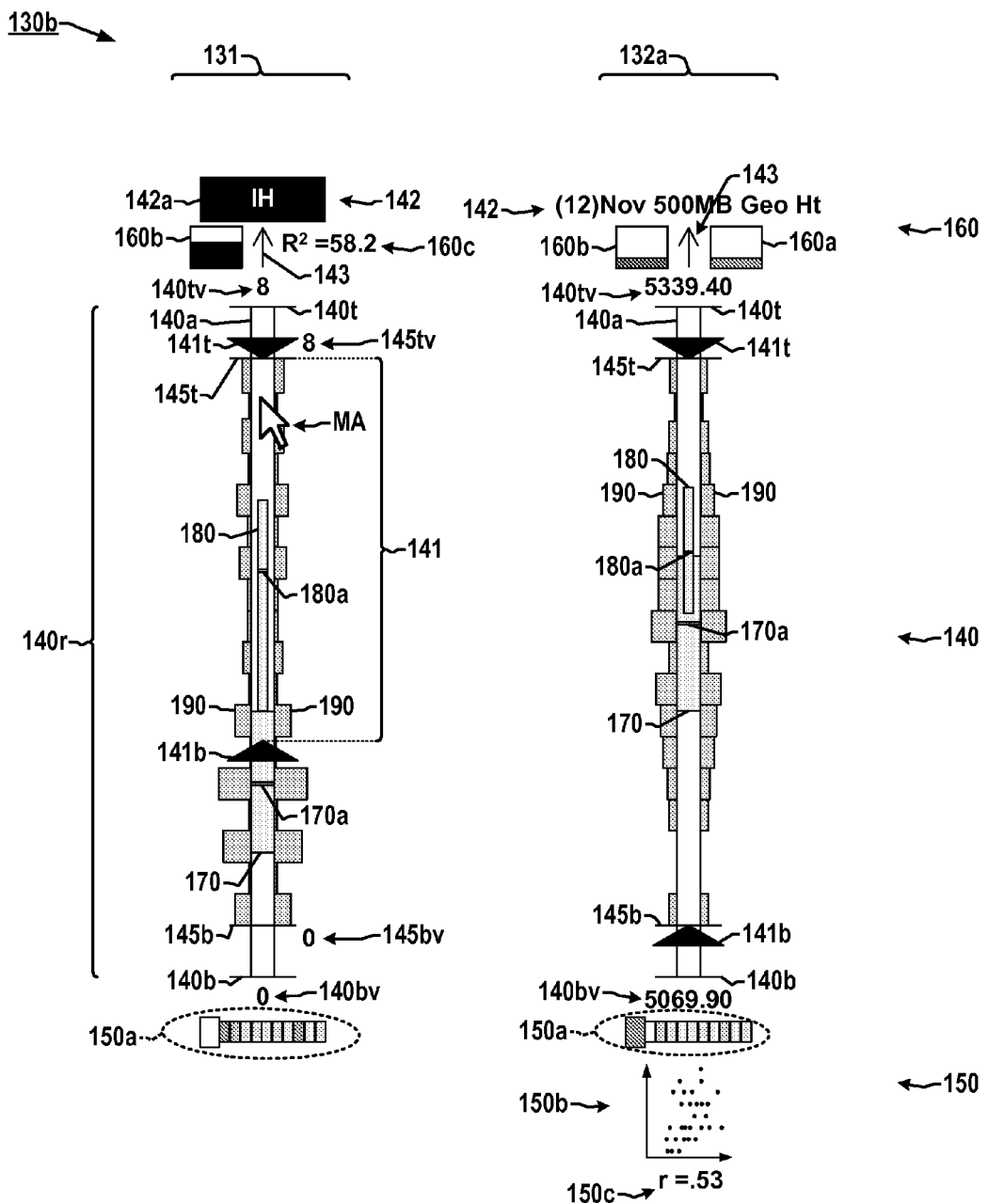
FIG. 2B is a partial front elevation view illustrating exemplary portions of the PCP view of FIGS. 1 and 2, showing exemplary dependent and independent variable portions with axis indicators, graphical correlation indicators, and graphical regression indicators, as well as histograms, query box plots, and overall box plots for displayed PCP axes.
Figure 2C:
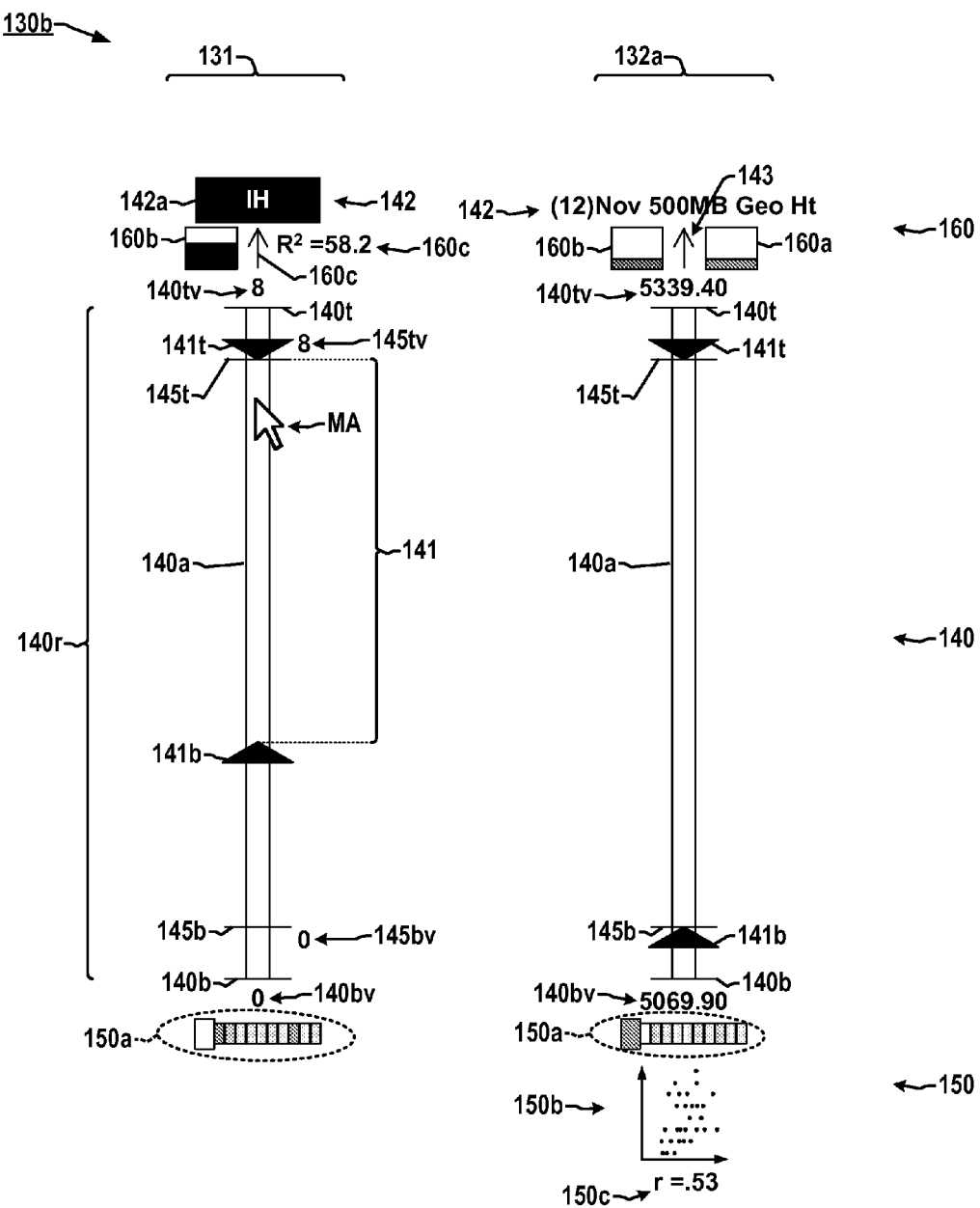
FIG. 2C illustrates another exemplary partial view of the display of FIGS. 1A and 1B, without the histograms or box plots.
Figure 2D:
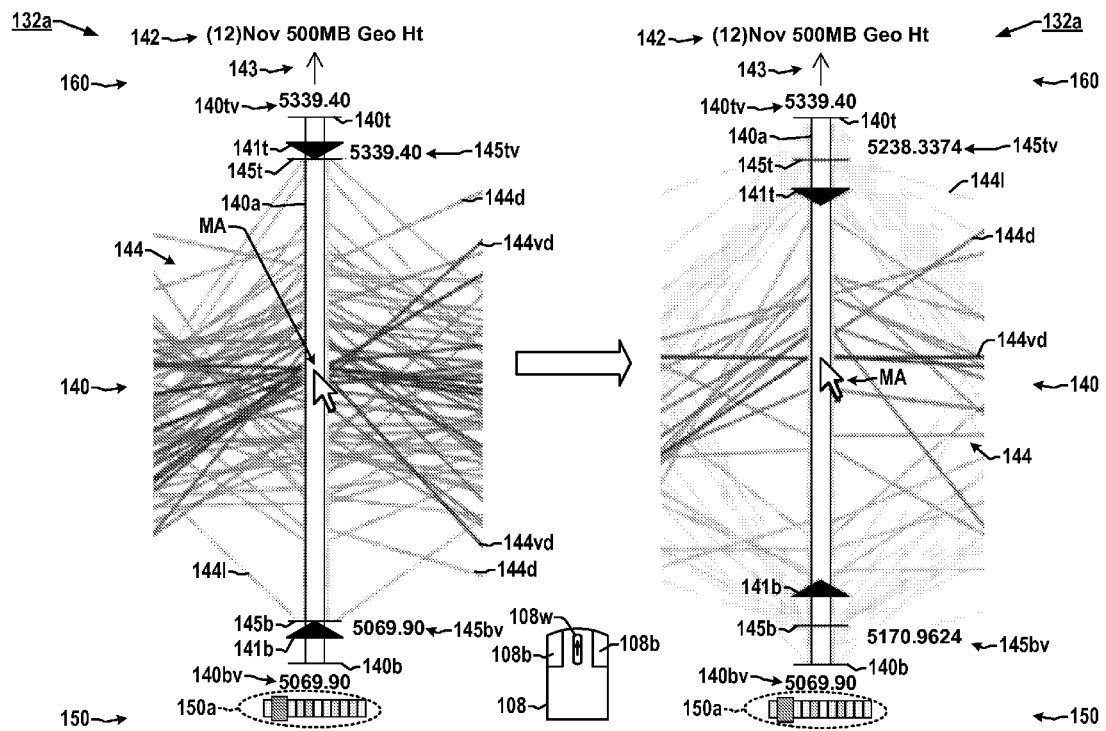
FIG. 2D is a partial front elevation view illustrating dynamic axis scaling of the exemplary independent variable axis indicator of FIGS. 2B and 2C.

Referring also to FIGS. 2B-2D, the system 102 provides a parallel coordinates view 130b with extensions such as frequency information display, dynamic axis reordering, axis inversion, and details-on-demand features, as well as double-ended sliders 141t, 141b on each axis indicator 140a to facilitate the investigation of subsets of data, where the user can drag these sliders 141t, 141b separately or in combination to dynamically adjust which relation lines 144 are highlighted, with lines 144 falling within the sliders 141t, 141b for all the axes are rendered in a more prominent manner giving the user the ability to perform rapid Boolean AND selections.

As best seen in FIGS. 2B and 2C, the axis region 140 includes a dependent variable axis indicator 140a (for a variable IH in this example) positioned on the left most of the region 140, as well as one or more independent variable axis indicators 140a (including an exemplary independent variable labeled "(12) November 500 MB Geo Ht"), where an alpha-numeric tag or label field 142 is provided above each of the displayed variable axis indicators 140a. In addition, as the user positions the mouse arrow MA over or proximate a particular one of the axis indicators 140a (e.g. within a particular one of the dependent or independent variable portions 131, 132), that axis indicator 140A is designated as currently being selected by the system 102, and the PCP view 130b indicates this selection by a graphical selection indicator 142a, in this case a darkened box with white lettering for the tag 142 to distinguish the tags 142 of the non selected axis indicators 140a. In the axis region 140, moreover, the user may selectively adjust one or both of the upper and lower limit indicators 141t, 141b, in this case shown as darkened arrows, in order to define a displayed focus range 141 within an overall variable data range for the axis indicator 140a between a top value 140t and a bottom value 140b defining an axis range 140r.

In the condition shown in FIG. 2B, moreover, the individual axis indicators 140A each include blocks 190 along both side of the indicator 140a with the lateral size of the blocks 190 indicating the relative data as a histogram in the axis region 140. The individual axis indicators 140a further include a query box plot 180 showing the variability within the focus range 141 of the associated data, and including a median value indicator 180a. Moreover, the axis indicators 140a further include an overall box plot indicator 170 with a corresponding median indicator 170a representing the distribution of the data within the entire range 140r of the associated variable data. The histogram indicators 190, the query box plot indicators 180, and/or the overall box plot indicators 170 may be selectively turned on or off by a user, wherein FIG. 2C illustrates the two exemplary variable portions 131 and 132a with these features turned off.

As shown in FIGS. 2B and 2C, the correlation region 150 in this embodiment includes one or more graphical correlation indicators. In this example, the region 150 includes a set of color coded correlation indicators 150a in the correlation region 150 of the PCP view 130b individually corresponding to each of the displayed variable axis indicators 140a, which are arranged in order according to the current ordering of the variable axis indicators 140a displayed in the axis region 140. In addition, the color coding of the set 150a is indicative of the correlation value associated with the corresponding variable of the data set 129a. It is noted in the examples of FIGS. 2B and 2C, that the color coded correlation indicator 150a associated with the currently selected axis indicator 140a (in this case with the dependent variable labeled "IH") is larger than the other color coded correlation indicators 150a in each set. In the illustrated embodiment, moreover, the graphical correlation indicator associated with a given axis indicator 140a includes a scatter plot indicator 150b in the correlation region 150 for the non selected independent variables shown in portions 132. These scatter plot indicators 150b include a plot of points in the data set 129a with data associated with the selected axis indicator 140a as a vertical axis, and with data associated with the given axis indicator 140a as a horizontal axis. In addition, the non selected independent variable portions 132 also provide a numeric indication of the Pearson product moment correlation coefficient, are shown as indicator 150c in FIGS. 2B and 2C.

In operation, the graphical correlation indicators 150a-150c facilitate graphical based user analysis of the correlation or strength of relationship between two variables, where the correlation coefficient 150c provides a numeric estimate of the correlation between two variables, in this case between the non selected variable at which the value 150c is displayed and the currently selected variable, in this case the dependent variable in portion 131. Moreover the sets 150a of color coded correlation indicators encode the correlation coefficient "r" between axis pairs according to the current ordering of the displayed axis indicators 140a and are thus represented in organized fashion beneath each axis as color coded blocks, with the currently selected variable shown as a larger block.

In this embodiment, moreover, each block uses color to encode the correlation coefficient according to a predefined color coding scheme between the axis directly above it and the axis that corresponds to its position in the set of blocks. For example, the first block in the indicators shown in FIG. 2B represents the correlation between the axis above the set 150a and the first axis labeled "IH". When the user positions the mouse arrow MA over a given axis, that axis is highlighted and its corresponding correlation indicator blocks are enlarged. In one possible color coding scheme, the blocks are shaded blue for negative correlations and red for positive correlations, with stronger correlations being depicted as more saturated coloring.

Above each axis indicator 140a, moreover, an arrow 143 depicts the direction of increasing values on the axis. This arrow can be clicked by the user to invert the axis thereby swapping the minimum and maximum limits and changing the direction of increasing values for the axis.

The system may include, and may allow user configuration of, a correlation threshold value, and when the absolute value of a correlation coefficient for a given axis is greater than or equal to the correlation threshold, the block is shaded with the fully saturated color, where the significant correlation coefficient in the embodiment of FIG. 2A is shown beneath the correlation region in the PCP view 130b. The scatter plots 150b further facilitate user analysis of correlations between variables of the data set 129a by providing a visual means to quickly confirm the type and strength of the correlation as well as a straight-forward representation to investigate non-linear or multimodal distributions. The graphical correlation features in the region 150, moreover, facilitate complex tasks such as multicolinearity filtering.

In addition, the system 102 provides an automatic multi-colinearity feature, where the PCP view 130B includes a user actuatable correlation filter control indicator 133c. In this case, the correlation component 127 (FIG. 1) is operative in response to actuation of the correlation filter control indicator 133c to determine if any currently selected variable axes are correlated with each other by more than the threshold value, and if so, to automatically remove the axis with a weaker correlation coefficient with respect to the dependent variable axis from the PCP view 130b. Thus, after application of this filter, the remaining axes are truly independent of one another, and the user can quickly reduce the set of displayed variables to a meaningful set that are highly predictive of a particular condition of the selected or designated dependent variable which is the subject of the analysis.

As further shown in FIGS. 2B and 2C, the PCP view 130b also includes a regression region 160 that provides one or more graphical and/or alpha numeric indicators that may be employed by a user to facilitate the analysis of the data set 129a. In these embodiments, the regression analysis component 128 (FIG. 1) selectively performs a simple linear regression (SLR) operation upon the user actuating a "run SLR process" indicator 133b (FIG. 1). The SLR operation is then automatically performed on the currently user selected variables of the data set 129a and provides an SLR regression value for one or more of the variables of the data set 129a. In the illustrated embodiments, the graphical regression indicator for one or more of the corresponding dependent or independent variable axis indicators 140A includes a graphical SLR indicator 160a that graphically indicates the SLR regression value associated with the corresponding variable axis indicator 140a. The SLR process quantitatively indicates the individual associations between predictors and the dependent variable. Once completed, the PCP view 130b provides a graphical box indicator 160a for the non-selected independent variables, which shows a color coded filled portion at the bottom with the amount of fill indicating the level of the associated SLR regression value.

In addition to simple linear regression, the system 102 provides stepwise multiple linear regression (MLR) operations via the regression analysis component 128, performed on user-selected variables of the data set 129a to provide an MLR regression value for at least one of the variables of the data set 129a. As shown in FIGS. 2B and 2C, a graphical MLR indicator 160b is provided for each of the axis indicators 140a in the region 160 to graphically indicate a resulting MLR regression value associated with the corresponding variable axis indicator 140a. In this example, graphical box indicators are provided with the amount of fill of the graphical box indicating the magnitude of the MLR regression value. In addition, the regression analysis component 128 also provides an MLR $R^2$ value ($R^2$ is 58.2 in the illustrated example), and the regression region 160 for the dependent variable includes a numeric $R^2$ value indicator 160C approximate to the dependent variable axis indicator 140a.

In the MLR operation of the illustrated example, a normalization procedure is employed such that the y intercept becomes 0 and the importance of a predictor can be assessed by comparing regression coefficients $b_i$ with a indicating a standard deviation of a variable, y as a dependent variable, x as a predictor mean, and y as the dependent variable mean, a number k of statistically significant predictors are normalized by the following equation:

$$(y - \bar{y})/\sigma_y = \sum_{i=1}^{k} b_i(x_i - \bar{x}_i)\sigma_i.$$

Thus, in addition to simple linear regression, the system 102 provides stepwise MLR capabilities with a backwards glance which selects the optimum number of the most important variables using a predefined significance level. In one implementation, a MATLAB regress and stepwise fit utilities may be employed by the system 102 to perform simple and stepwise regression, respectively (e.g., component 128). These regression capabilities complement the visual analysis capabilities provided by the PCP view 130b by isolating the significant variables in a quantitative fashion. In the MLR operation, a normalization procedure is used in one embodiment so that the y intercept becomes 0 and the importance of a predictor can be assessed by comparing regression coefficients. The system 102 visually encodes the MLR coefficients in the PCP view 130b using the boxes 160b, where the box 160b for the dependent variable in portion 131 indicates the overall MLR $R^2$ indicator, and the boxes 160b in the portions 132 associated with the independent variables indicates the corresponding MLR $B_i$ indicator. Like a thermometer, the boxes 160b are filled from the bottom to the top based on the magnitude of the coefficient B. In addition, the illustrated embodiment provides that that box 160b is colored red if the coefficient is positive and blue if it is negative. Moreover, the indicated $R^2$ value shown as indicator 160c indicates the value of the coefficient of multiple determinations $R^2$ which quantitatively captures the variance explained by the predictors for the dependent, with the box 160b beneath the dependent variable axis name 142 encodes $R^2$ value from the MLR operation.

Referring also to FIG. 2D, the system 102 further provides dynamic axis scaling functionality allowing interactive tunneling through the data set 129a until a smaller sub set of the original data is in focus. This feature facilitates user modification of the scale to adjust the focus area 141 of a selected axis using motion of a mouse wheel 108w of a mouse input device 108. As shown in FIG. 2D, the mouse 108 includes two mouse buttons 108b as well as a centrally located mouse 108w. As depicted in the left portion of FIG. 2D, when the user positions the mouse arrow MA over or proximate to a selected axis indicator 140a, the PCP component 126 is operative when the user rotates the mouse wheel 108w to concurrently adjust the upper and lower limits to expand a displayed focus range 141 of the selected axis indicator 140a in response to mouse wheel rotation in a first direction, and to compress the displayed focused range 141 of the selected axis indicator 140a in response to mouse wheel rotation in a second opposite direction. Thus, as shown in the right portion of FIG. 2D, when the user rotates the mouse wheel 108w in the direction shown by the arrow in FIG. 2D, the focus range 141 is compressed by the mouse wheel actuation. The mouse wheel thus controls the minimum and maximum values for the focus area when rotated with the mouse cursor MA positioned in or near to the middle context area of the axis indicator 140a. As shown in the left-most portion of FIG. 2D, prior to this focus adjustment, the focus area 141 spans the entire axis range 140r, and the display 132a shows two numbers 140tv, 145tv at the top (both 5339.40 in this example) as well as two numbers 140bv, 145bv at the bottom (5069.90). The number 140tv above the axis indicator 140a is the overall max value and the number 145tv to the right of the axis is the max value for the focus area (the focus area is between the two tick marks (145t, 145b) in the middle of the axis indicator 140a). The lower part of the axis indicator 140a has the minimum values numerically indicated by numbers 145bv and 140bv (5069.90) for the focus and overall ranges, respectively. On the right in FIG. 2D (after the user has move the mouse wheel 108w up or away from the user), the focus limits have moved closer together which has the effect of zooming into the lines 144. At this point, the upper focus area value 145tv has changed to 5238.3374, while the overall upper range value 140tv remains at 5339.40, and likewise the lower focus value 145bv has changed to 5170.9624 with the overall minimum value 140bv remaining at 5069.90. Moreover, this mouse wheel manipulation operates to push the lines 144 outside the adjusted focus area limits out into the upper and lower context areas, and these are accordingly changed from dark or very dark shading to a light shading. Moving the mouse wheel down (toward the user) has the opposite effect, with the focus area 141 being expanded, and the lines in the context are moved back into the focus area.

The black triangles (query sliders 141t and 141b) are not affected by the mouse wheel functionality, but instead can be dragged by the mouse 108 to query particular regions of the lines 144. The PCP component 126 tool will render those lines 144 that fall between every shown axis query slider pair with the most prominent (darkest) color which gives the user an ability to perform rapid Boolean AND queries. The user in certain embodiments may also use the mouse wheel when the mouse cursor MA is over either of the two upper or lower context areas to alter the minimum or maximum values separately. In addition, the user may manually enter the minimum and maximum values by typing them in the appropriate fields of the data list portion 130c (FIG. 1). In operation, the dynamic axis scaling capabilities make it easier for the user to free space and reduce line clutter, thereby making it easier to analyze relation of lines 144 of interest.

With continued reference to FIG. 2D, system 102 also advantageously provides aerial perspective shading functionality in one of two modes. These enhanced line shading schemes facilitate rapid monitoring of trends due to similarity of data values over multiple dimensions, in which the contrast between objects and the background decreased as the distance between the viewer and the object increases. This aerial perspective shading functionality in one implementation is a discrete mode function, in which the relation lines 144 are colored according to the axis region that they intersect. In this regard, as shown in FIG. 2D, the PCP view 130b includes relation lines 144 passing through at least some of the variable axis indicators 140a, with some of the lines 144l being lightly shaded, others being more darkly shaded 144d, and still others being very darkly shaded 144vd. In the discrete shading embodiments, a given relation line 144 is lightly shaded (144l) if any point of the relation line is outside the focus range 144 of at least one displayed axis indicator 140a. Also, a given relation line is very darkly shaded (144vd) if all points of the relation line 144 are within the focus range 141 of each displayed axis indicator 140a. Moreover, in the discrete mode, the remaining relation lines 144d are moderately darkly shaded.

Another (continuous mode) aerial perspective shading embodiment presents the relation lines 144 passing through one or more of the axis indicators 140a, where relation lines for which all points of the line are within the focus range 144 of each displayed axis indicator 140a are displayed in a first darkness range with relation lines 144 nearest to the axis selection indication MA being darkest and with relation lines farther from the axis selection indicator MA being less dark. In this case, remaining relation lines 144 for which any point of the relation line 144 is outside the focus range 141 of at least one displayed axis indicator 140a are shaded according to a nonlinear fall off function that yields a gradient of colors with relation lines 144 nearest to the axis selection indicator MA more prominent than relation lines 144 farther from the axis selection indicator MA. Thus, the lines 144 that are nearest to the mouse arrow MA are more prominent to the user due to the color and depth ordering treatments and the user can effectively use the mouse 108 to quickly interrogate the data set 129a. This proximity shading scheme in the system 102 facilitates rapid investigation of multi dimensional relationships in the data set 129a, thereby facilitating the user's ability to achieve a deeper understanding of the environmental or other multivariate data 129a.

Referring also to FIG. 2A, the system 102 further facilitates user analysis by providing various controls in the control portion 130a of the display 130. Various user-actuatable control indicia 133 are shown in the control portion 130a. Among these are "run MLR process" indicator 133a for user actuation of the above described MLR operations, a "run SLR process" actuator 133b for initiating SLR operations, a "run correlation filter" indicator 133c operable as described above to initiate automated multicolinearity operations, and the control portion 130a also provides the ability to automatically arrange the axes in the PCP view 130b using one of the dynamically computed statistical measures previously discussed. In this regard, the user can choose to sort the axes by one of the following statistical measures: correlation coefficient (indicator 133g), interquartile range/standard deviation range, by MLR coefficient (indicator 133e), or by SLR $r^2$ value (indicator 133f). When sorting by the correlation coefficients, the axes with negative correlations in one embodiment are arranged to the left of the highlighted axis in ascending order, and axes with positive correlations are arranged to the right in descending order. In this embodiment, moreover, when sorting by the other statistical measures, the dependent axis (IH in this example) is placed at the left-most position with the other axes being arranged in descending order based on the selected measures.

Figure 3:
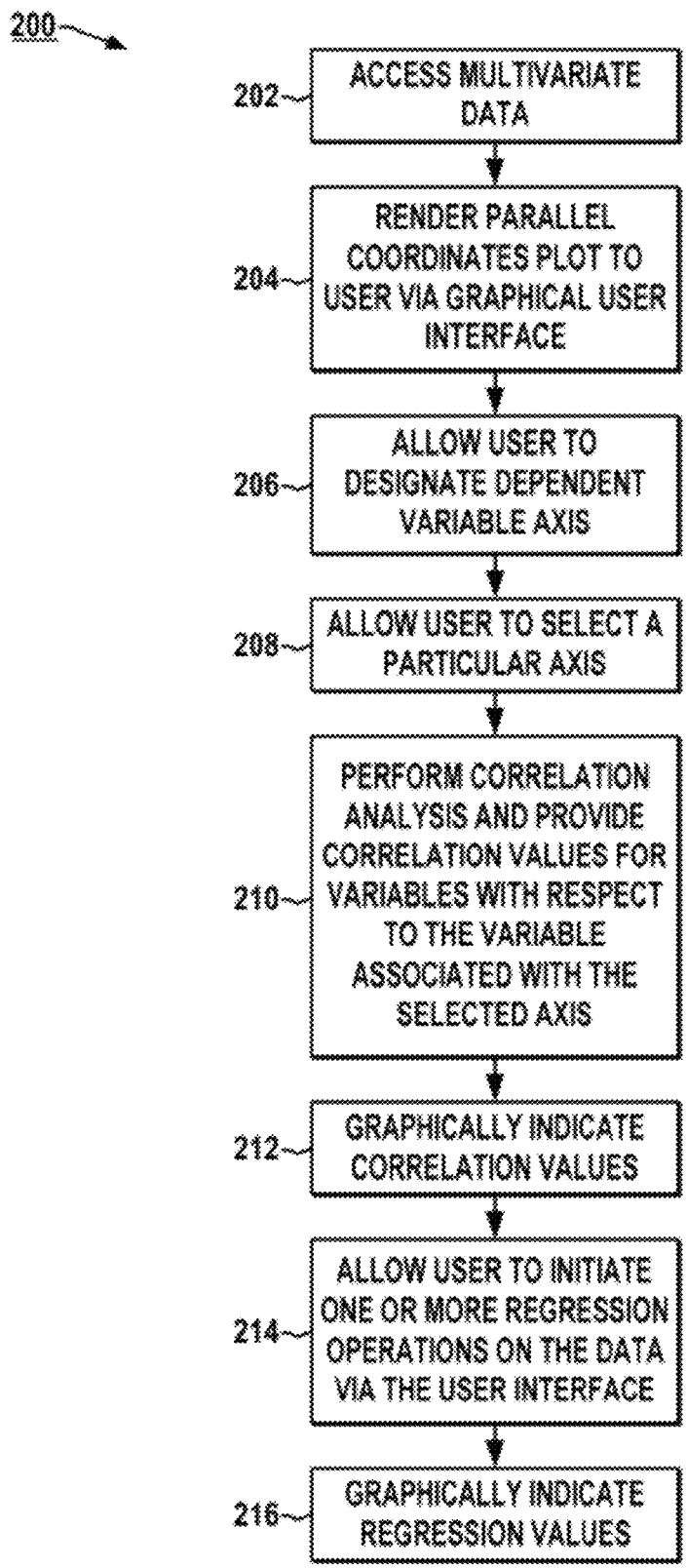
FIG. 3 is a flow diagram illustrating an exemplary method for identifying and/or quantifying sets of independent variables predictive of condition of an identified dependent variable in multivariate data set in accordance with one or more aspects of the disclosure.

Referring now to FIG. 3, a method 200 is illustrated for identifying and/or quantifying sets of independent variables that are predictive of conditions of an identified dependent variable in a multivariate data set 129a. The method 200 includes accessing a multivariate data set (129a) at 202 and rendering a PCP plot at 204 to the user via a graphical user interface (interface 122 above). The rendered PCP view (130b) includes a dependent variable portion 131 including a dependent variable axis indicator 140a that visually displays one or more attributes of a dependent variable of the data set 129a, as well as a plurality of independent portions 132 as described above. The method further includes receiving one or more user control inputs via a user interface, and selectively modifying the PCP view 130b according to the user control input. At 206, the user is allowed to designate one of the axis indicators 140a as being a selected axis indicator 140a via the user control input, and at 208 the user is allowed to select a particular axis, for instance, using an axis selection indicator MA via the user control input. At 210, the method further includes performing one or more correlation operations on user selected variables of the data set 129a to provide correlation values for variables with respect to the variable associated with the selected axis period. At 212, the plurality of graphical correlation indicators (e.g. 150a, 150b above) are rendered, for example, in a correlation region 150 of the PCP view 130b. In the illustrated method, moreover, the user is allowed at 214 to initiate one or more regression operations on the data via the user interface, and a plurality of graphical regression indicators (160a-160c above) are rendered at 216 to individually graphically indicate at least one regression value associated with the corresponding variable of the data set 129a.

In further aspects of the present disclosure, a non-transitory computer readable medium is provided having computer executable instructions for performing the above method 200.

Figure 4:
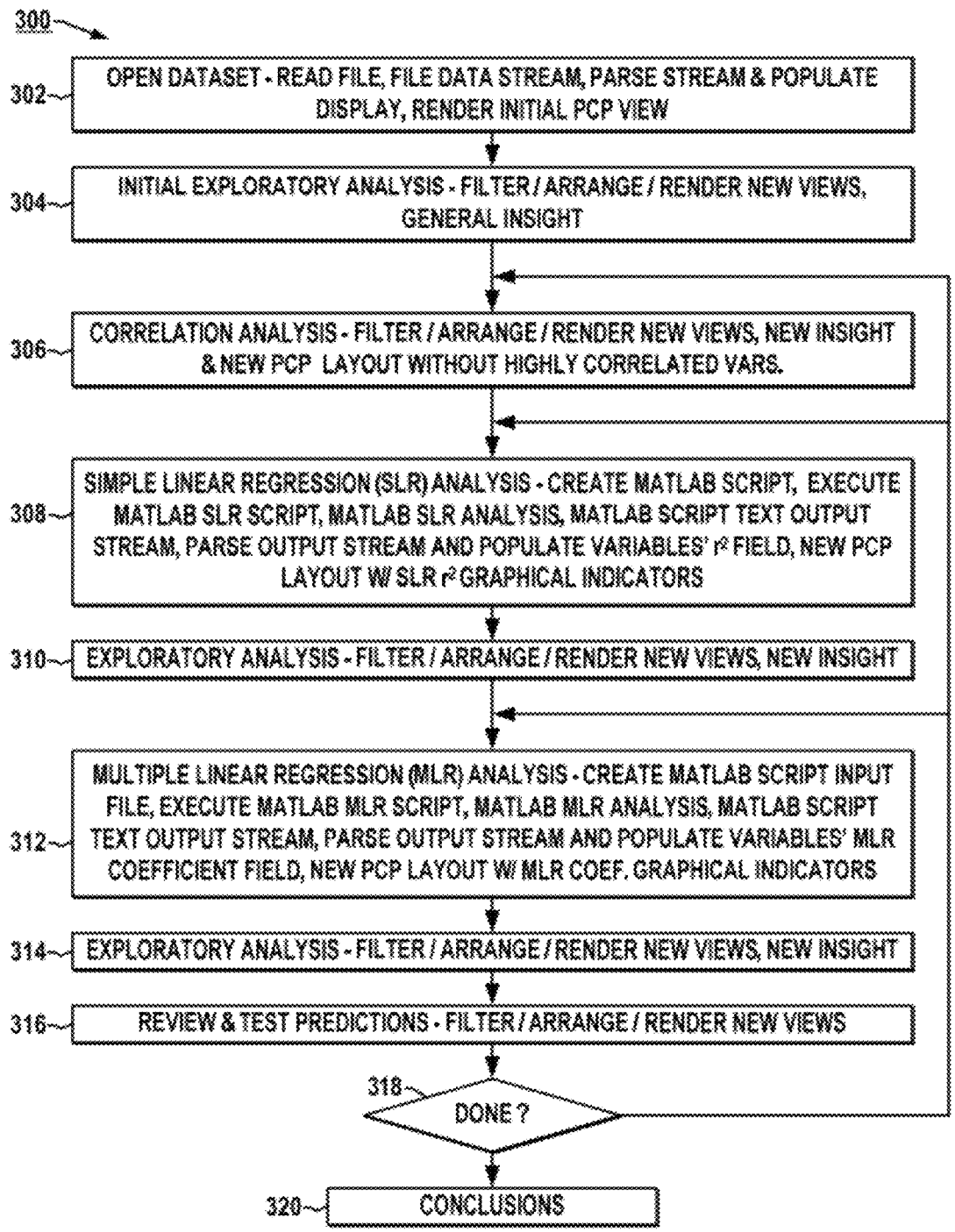
FIG. 4 is a flow diagram illustrating an exemplary process flow in which a user employs the system and method of FIGS. 1-3.

FIG. 4 illustrates an exemplary process 300 in which a user employs the system 102 for climate analysis or other analysis to find variables predictive of the behavior of a dependent variable of a multivariate data set 129a. Although the workflow is described in a sequential order, typical analysis involves several iterations and moving between the various processes. At 302, the user directs the system 102 to open the data set 129a, and the system 102 receives a file data stream from the source of the data set 129a. The system 102 parses the data stream and populates the PCP display data and graphics, and uses the graphic display 104 to render the initial PCP view 130b to the user. At 304, after preparing and loading the data set into the system 102, the user can filter the data to remove unnecessary variables, rearrange the variable axes with the PCP component 126 rearranging the display 130b to render new views, and the user interacts with the displayed information including the above-mentioned graphical renderings and information to develop a general insight of the data set 129a. In this initial exploratory analysis phase, graphical statistical indicators and variable comparison capabilities provide vital assistance to the user.

At 306, the user employs the system 102 to perform one or more types of correlation analysis, such as use of the "arrange by correlation" and/or "run correlation filter" actuators 133g, 133c (FIG. 1) and can observe the statistical correlations in the data using the correlation indicators and axis arrangement methods. In this stage, the user will prepare for regression analysis by identifying the most informative variables and taking steps to reduce multi co linearity among the independent variables. Automated filters for ensuring the independence between predictors and identifying significant associations are useful system capabilities at this stage. The user thus employs the system 102 to remove highly correlated variables using a predefined significance level or threshold. In addition to revealing the variables' trends, this improves subsequent regression analysis results. The user at this point can gain additional insight by observing correlations between the predictors as well as correlations between each predictor and the dependent variable.

At 308 and 312, the user employs the regression analysis capabilities via the regression component 128 and the PCP view 130b (e.g., using the control actuators 133a, 133b, 133e, 133f, and the graphic indicators shown in the correlation region 150 and the regression region 160) to continue the investigation of the data set 129a.

At 308, the user causes the system 102 to perform one or more SLR operations to quantitatively indicate the individual associations between predictors and the dependent variable. In an embodiment using MATLAB as the regression component 128, the system creates a MATLAB script that is executed and a script text output stream is provided to the PCP component 126, which is then parsed and the $r^2$ field is populated. The PCP component 126 then generates a new PCP view 130b including the SLR graphical indicators in the regression region 160 for further exploratory analysis at 310, and the user can again filter/arrange the data and the system 102 renders new/updated views 130b for new insight by the user who can more clearly see how each variable separately affects the dependent variable using the SLR results.

At 312, the user can employ MLR operations to quantify the significance of several predictors with respect to the designated dependent variable, with the system 102 providing a ranked list of the most important variables. In one embodiment, the PCP component 126 creates a MATLAB script input file, and the regression component 128 executes the script and generates a text output stream. The PCP component 126 parses the stream and populates the MLR coefficient fields of the variables and generates the MLR graphical indicators 160b and 160c to present a new PCP view 130b. The user can then perform further exploratory analysis at 314

The user may continue to explore the data using the above described correlation and/or regression tools and other features of the system 102 in an iterative or random fashion to develop new ideas about how the specific variables can be used to predict the dependent variable. That is, the user will have formed hypotheses about the associations between the variables. The user at any time can attempt to prove or disprove the new hypotheses via confirmatory data analysis at 316. For example, the user can analyze climate data from a range of years (dependent variable) from 1950 to 2006 to discover patterns that can be used to predict above normal hurricane activity. These patterns are identified by selecting specific ranges for a set of variables that coincide with above normal hurricane seasons. The user can then verify the accuracy of the patterns by examining its performance in particular years of interest, such as the active 2005 season or the below normal 2006 season. If the patterns perform well, the user may use the new insight in future forecasts. Thus, the disclosed system 102 and methods 200 facilitate identifying and/or quantifying the most important variables (ranked) for a particular dependent variable.

The above described methods can be embodied as computer-executable instructions on a non-transitory tangible computer-readable medium, such as a magnetic disk, optical disk, flash drive or other computer readable memory or medium from which the instructions can be read my a processing element for execution.

The above examples are merely illustrative of several possible embodiments of various aspects of the present disclosure, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, processor-executed software, or combinations thereof, which performs the specified function of the described component (i.e., that is functionally equivalent), even though not structurally equivalent to the disclosed structure which performs the function in the illustrated implementations of the disclosure. In addition, although a particular feature of the disclosure may have been illustrated and/or described with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

The following is claimed:

1. A processor-based system for identifying and/or quantifying associations in a multivariate data set, comprising:
a user interface operative to receive at least one user control input and having a graphic display operative to render visual images to a user;
a parallel coordinates plot (PCP) component operative to generate a PCP view for rendering on the graphic display and to selectively modify the PCP view according to the user control input, the PCP view comprising:
a dependent variable portion including a dependent variable axis indicator visually displaying one or more attributes of a user-designated dependent variable of the data set,
a plurality of independent variable portions individually including an independent variable axis indicator visually displaying one or more attributes of an independent variable of the data set, the independent and dependent variable axis indicators being generally parallel and aligned with one another in an axis region of the PCP view,
an axis selection indicator operable via the user control input to designate one of the axis indicators as being a selected axis indicator, and
a plurality of graphical correlation indicators individually associated with and proximate to a corresponding dependent or independent variable axis indicator in a correlation region of the PCP view, the graphical correlation indicators being operative to graphically indicate a correlation value associated with the corresponding variable of the data set and with a variable associated with the selected axis indicator; and
a correlation component operative to selectively perform one or more correlation operations on user-selected variables of the data set to provide the correlation values to the PCP component.

2. The system of claim 1, further comprising a regression analysis component operative to selectively perform one or more regression operations on user-selected variables of the data set and to provide one or more regression values associated with one or more variables of the data set.

3. The system of claim 2, where the PCP view further comprises a plurality of graphical regression indicators individually associated with and proximate to a corresponding dependent or independent variable axis indicator in a regression region of the PCP view, the graphical regression indicators being operative to graphically indicate at least one regression value associated with the corresponding variable of the data set.

4. The system of claim 3, where the regression analysis component is operative to selectively perform a simple linear regression (SLR) operation on user-selected variables of the data set and to provide an SLR regression value for at least one of the variables of the data set, and where the graphical regression indicator for at least one corresponding dependent or independent variable axis indicator includes a graphical simple linear regression (SLR) indicator graphically indicating a SLR regression value associated with the corresponding dependent or independent variable axis indicator.

5. The system of claim 4, where the regression analysis component is operative to selectively perform a multiple linear regression (MLR) operation on user-selected variables of the data set and to provide an MLR regression value for at least one of the variables of the data set, and where the graphical regression indicator for at least one corresponding dependent or independent variable axis indicator includes a graphical multiple linear regression (MLR) indicator graphically indicating an MLR regression value associated with the corresponding dependent or independent variable axis indicator.

6. The system of claim 5, where the regression analysis component is operative to provide an MLR $R^2$ value based on the MLR operation, and where the graphical regression indicator for the dependent variable axis indicator includes a numeric $R^2$ value indicator proximate to the dependent variable axis indicator in the regression region of the PCP view, the numeric $R^2$ value indicator indicating the MLR $R^2$ value.

7. The system of claim 5, where the graphical correlation indicator for a given axis includes a set of visually distinguishable correlation indicators in the correlation region of the PCP view individually corresponding to a displayed variable axis indicator and arranged in order according to a current ordering of the variable axis indicators displayed in the axis region of the PCP view, with a visual indicia of each member of the set of correlation indicators being indicative of a correlation value associated with the corresponding variable of the data set.

8. The system of claim 7, where the set of correlation indicators includes a set of color-coded correlation indicators, with the color coding of the set being indicative of a correlation value associated with the corresponding variable of the data set.

9. The system of claim 7, where the visually distinguishable correlation indicator associated with the selected axis indicator is larger than the other visually distinguishable correlation indicators in each set.

10. The system of claim 7, where the graphical correlation indicator associated with a given axis indicator includes a scatter plot indicator in the correlation region of the PCP view, the scatter plot indicator including a plot of points of the data set with data associated with the selected axis indicator as a vertical axis and with data associated with the given axis indicator as a horizontal axis.

11. The system of claim 7, where the PCP view comprises a user-actuatable correlation filter control indicator, and where the correlation component is operative in response to actuation of the correlation filter control indicator to determine if any currently selected variable axes are correlated with each other by more than a threshold value, and if so, to automatically remove the axis with a weaker correlation coefficient with respect to the dependent variable axis from the PCP view.

12. The system of claim 7, where the PCP component is operative when the user rotates a mouse wheel to concurrently adjust upper and lower limits to expand a displayed focus range of the selected axis indicator in response to mouse wheel rotation in a first direction and to compress the displayed focus range of the selected axis indicator in response to mouse wheel rotation in a second opposite direction.

13. The system of claim 7, where at least some of the variable axis indicators include user adjustable upper and lower limit indicators to define a displayed focus range associated with the axis indicator, where the PCP view comprises relation lines passing through at least some variable axis indicators, where a given relation line is lightly shaded if any point of the relation line is outside the focus range of at least one displayed axis indicator, where a given relation line is very darkly shaded if all points of the relation line are within the focus range of each displayed axis indicator, and where the remaining relation lines are moderately darkly shaded.

14. The system of claim 7, where at least some of the variable axis indicators include user adjustable upper and lower limit indicators to define a displayed focus range associated with the axis indicator, where the PCP view comprises relation lines passing through at least some variable axis indicators, where relation lines for which all points of the relation line are within the focus range of each displayed axis indicator are displayed in a first darkness range with relation lines nearest to the axis selection indicator are darkest and relation lines farther from the axis selection indicator are less dark, and where remaining relation lines for which any point of the relation line is outside the focus range of at least one displayed axis indicator are shaded according to a nonlinear fall-off function that yields a gradient of visual indicia with relation lines nearest to the axis selection indicator more prominent than relation lines farther from the axis selection indicator.

15. The system of claim 3, where the regression analysis component is operative to selectively perform a multiple linear regression (MLR) operation on user-selected variables of the data set and to provide an MLR regression value for at least one of the variables of the data set, and where the graphical regression indicator for at least one corresponding dependent or independent variable axis indicator includes a graphical multiple linear regression (MLR) indicator graphically indicating an MLR regression value associated with the corresponding dependent or independent variable axis indicator.

16. The system of claim 15, where the regression analysis component is operative to provide an MLR $R^2$ value based on the MLR operation, and where the graphical regression indicator for the dependent variable axis indicator includes a numeric $R^2$ value indicator proximate to the dependent variable axis indicator in the regression region of the PCP view, the numeric $R^2$ value indicator indicating the MLR $R^2$ value.

17. The system of claim 3, where the graphical correlation indicator for a given axis includes a set of visually distinguishable correlation indicators in the correlation region of the PCP view individually corresponding to a displayed variable axis indicator and arranged in order according to a current ordering of the variable axis indicators displayed in the axis region of the PCP view, with a visual indicia of each member of the set of correlation indicators being indicative of a correlation value associated with the corresponding variable of the data set.

18. The system of claim 17, where the set of correlation indicators includes a set of color-coded correlation indicators, with the color coding of the set being indicative of a correlation value associated with the corresponding variable of the data set.

19. The system of claim 17, where the visually distinguishable correlation indicator associated with the selected axis indicator is larger than the other visually distinguishable correlation indicators in each set.

20. The system of claim 17, where the graphical correlation indicator associated with a given axis indicator includes a scatter plot indicator in the correlation region of the PCP view, the scatter plot indicator including a plot of points of the data set with data associated with the selected axis indicator as a vertical axis and with data associated with the given axis indicator as a horizontal axis.

21. The system of claim 1, where the graphical correlation indicator for a given axis includes a set of visually distinguishable correlation indicators in the correlation region of the PCP view individually corresponding to a displayed variable axis indicator and arranged in order according to a current ordering of the variable axis indicators displayed in the axis region of the PCP view, with a visual indicia of each member of the set of correlation indicators being indicative of a correlation value associated with the corresponding variable of the data set.

22. The system of claim 21, where the set of correlation indicators includes a set of color-coded correlation indicators, with the color coding of the set being indicative of a correlation value associated with the corresponding variable of the data set.

23. The system of claim 21, where the visually distinguishable correlation indicator associated with the selected axis indicator is larger than the other visually distinguishable correlation indicators in each set.

24. The system of claim 21, where the graphical correlation indicator associated with a given axis indicator includes a scatter plot indicator in the correlation region of the PCP view, the scatter plot indicator including a plot of points of the data set with data associated with the selected axis indicator as a vertical axis and with data associated with the given axis indicator as a horizontal axis.

25. The system of claim 21, where the PCP view comprises a user-actuatable correlation filter control indicator, and where the correlation component is operative in response to actuation of the correlation filter control indicator to determine if any currently selected variable axes are correlated with each other by more than a threshold value, and if so, to automatically remove the axis with a weaker correlation coefficient with respect to the dependent variable axis from the PCP view.

26. The system of claim 21, where the PCP component is operative when the user rotates a mouse wheel to concurrently adjust upper and lower limits to expand a displayed focus range of the selected axis indicator in response to mouse wheel rotation in a first direction and to compress the displayed focus range of the selected axis indicator in response to mouse wheel rotation in a second opposite direction.

27. The system of claim 21, where at least some of the variable axis indicators include user adjustable upper and lower limit indicators to define a displayed focus range associated with the axis indicator, where the PCP view comprises relation lines passing through at least some variable axis indicators, where a given relation line is lightly shaded if any point of the relation line is outside the focus range of at least one displayed axis indicator, where a given relation line is very darkly shaded if all points of the relation line are within the focus range of each displayed axis indicator, and where the remaining relation lines are moderately darkly shaded.

28. The system of claim 21, where at least some of the variable axis indicators include user adjustable upper and lower limit indicators to define a displayed focus range associated with the axis indicator, where the PCP view comprises relation lines passing through at least some variable axis indicators, where relation lines for which all points of the relation line are within the focus range of each displayed axis indicator are displayed in a first darkness range with relation lines nearest to the axis selection indicator are darkest and relation lines farther from the axis selection indicator are less dark, and where remaining relation lines for which any point of the relation line is outside the focus range of at least one displayed axis indicator are shaded according to a nonlinear fall-off function that yields a gradient of visual indicia with relation lines nearest to the axis selection indicator more prominent than relation lines farther from the axis selection indicator.

29. The system of claim 1, where the PCP view comprises a user-actuatable correlation filter control indicator, and where the correlation component is operative in response to actuation of the correlation filter control indicator to determine if any currently selected variable axes are correlated with each other by more than a threshold value, and if so, to automatically remove the axis with a weaker correlation coefficient with respect to the dependent variable axis from the PCP view.

30. The system of claim 1, where the PCP component is operative when the user rotates a mouse wheel to concurrently adjust upper and lower limits to expand a displayed focus range of the selected axis indicator in response to mouse wheel rotation in a first direction and to compress the displayed focus range of the selected axis indicator in response to mouse wheel rotation in a second opposite direction.

31. The system of claim 1, where at least some of the variable axis indicators include user adjustable upper and lower limit indicators to define a displayed focus range associated with the axis indicator, where the PCP view comprises relation lines passing through at least some variable axis indicators, where a given relation line is lightly shaded if any point of the relation line is outside the focus range of at least one displayed axis indicator, where a given relation line is very darkly shaded if all points of the relation line are within the focus range of each displayed axis indicator, and where the remaining relation lines are moderately darkly shaded.

32. The system of claim 1, where at least some of the variable axis indicators include user adjustable upper and lower limit indicators to define a displayed focus range associated with the axis indicator, where the PCP view comprises relation lines passing through at least some variable axis indicators, where relation lines for which all points of the relation line are within the focus range of each displayed axis indicator are displayed in a first darkness range with relation lines nearest to the axis selection indicator are darkest and relation lines farther from the axis selection indicator are less dark, and where remaining relation lines for which any point of the relation line is outside the focus range of at least one displayed axis indicator are shaded according to a nonlinear fall-off function that yields a gradient of visual indicia with relation lines nearest to the axis selection indicator more prominent than relation lines farther from the axis selection indicator.

33. A method for identifying and/or quantifying associations in a multivariate data set, the method, comprising:
accessing a multivariate data set;
rendering a parallel coordinates plot (PCP) view on a graphic display according to the multivariate data set using a processor-based system, the PCP view comprising:
a dependent variable portion including a dependent variable axis indicator visually displaying one or more attributes of a dependent variable of the data set, and
a plurality of independent variable portions individually including an independent variable axis indicator visually displaying one or more attributes of an independent variable of the data set, the independent and dependent variable axis indicators being generally parallel and aligned with one another in an axis region of the PCP view;
receiving at least one user control input via a user interface;
selectively modifying the PCP view according to the user control input;
allowing the user to designate one of the axis indicators as being a selected axis indicator via the user control input;
allowing the user to select a particular axis indicator using an axis selection indicator via the user control input;
performing at least one correlation operation on user-selected variables of the data set to provide correlation values; and
rendering a plurality of graphical correlation indicators individually associated with and proximate to a corresponding dependent or independent variable axis indicator in a correlation region of the PCP view, the graphical correlation indicators graphically indicating a correlation value associated with the corresponding variable of the data set and with a variable associated with the selected axis indicator.

34. The method of claim 33, further comprising:
selectively performing one or more regression operations on user-selected variables of the data set to provide one or more regression values associated with one or more variables of the data set; and
rendering a plurality of graphical regression indicators individually associated with and proximate to a corresponding dependent or independent variable axis indicator in a regression region of the PCP view, the graphical regression indicators graphically indicating at least one regression value associated with the corresponding variable of the data set.

35. A non-transitory computer readable medium having computer-executable instructions for:
accessing a multivariate data set;
rendering a parallel coordinates plot (PCP) view on a graphic display according to the multivariate data set using a processor-based system, the PCP view comprising:
a dependent variable portion including a dependent variable axis indicator visually displaying one or more attributes of a dependent variable of the data set, and
a plurality of independent variable portions individually including an independent variable axis indicator visually displaying one or more attributes of an independent variable of the data set, the independent and dependent variable axis indicators being generally parallel and aligned with one another in an axis region of the PCP view;
receiving at least one user control input via a user interface;
selectively modifying the PCP view according to the user control input;
allowing the user to designate one of the axis indicators as being a selected axis indicator via the user control input;
allowing the user to select a particular axis indicator using an axis selection indicator via the user control input;
performing at least one correlation operation on user-selected variables of the data set to provide correlation values; and
rendering a plurality of graphical correlation indicators individually associated with and proximate to a corresponding dependent or independent variable axis indicator in a correlation region of the PCP view, the graphical correlation indicators graphically indicating a correlation value associated with the corresponding variable of the data set and with a variable associated with the selected axis indicator.

36. The non-transitory computer readable medium of claim 35, further comprising computer-executable instructions for:
selectively performing one or more regression operations on user-selected variables of the data set to provide one or more regression values associated with one or more variables of the data set; and rendering a plurality of graphical regression indicators individually associated with and proximate to a corresponding dependent or independent variable axis indicator in a regression region of the PCP view, the graphical regression indicators graphically indicating at least one regression value associated with the corresponding variable of the data set.

* * * * *